C. SATTLER.
ELASTIC BODY.
APPLICATION FILED JUNE 30, 1919.
1,379,216.
Patented May 24, 1921.
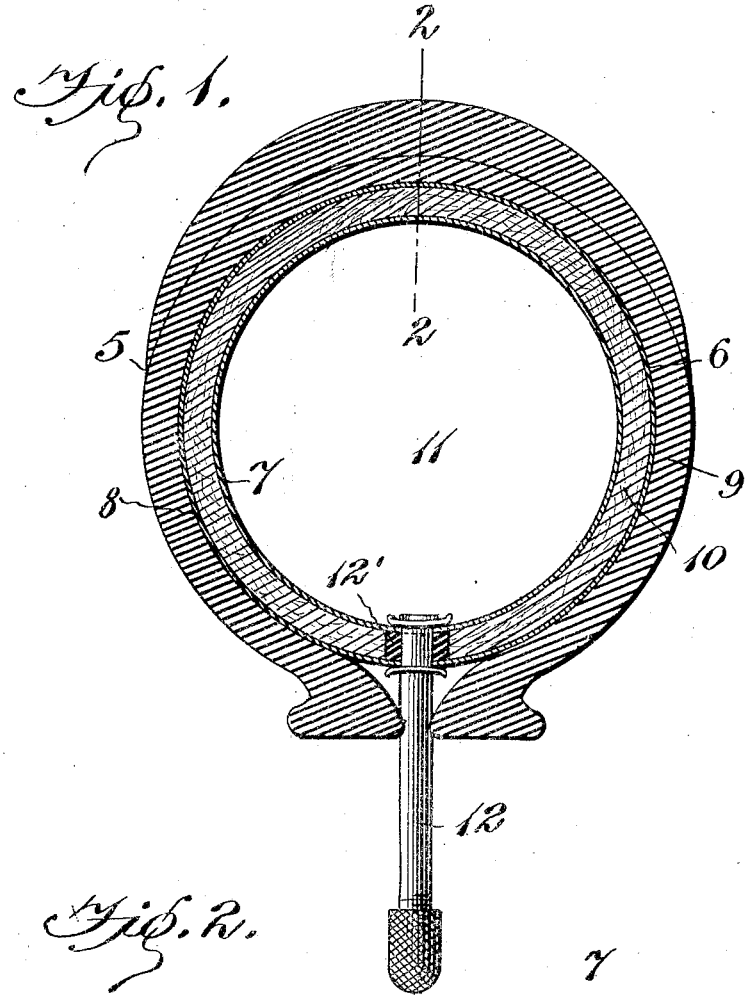
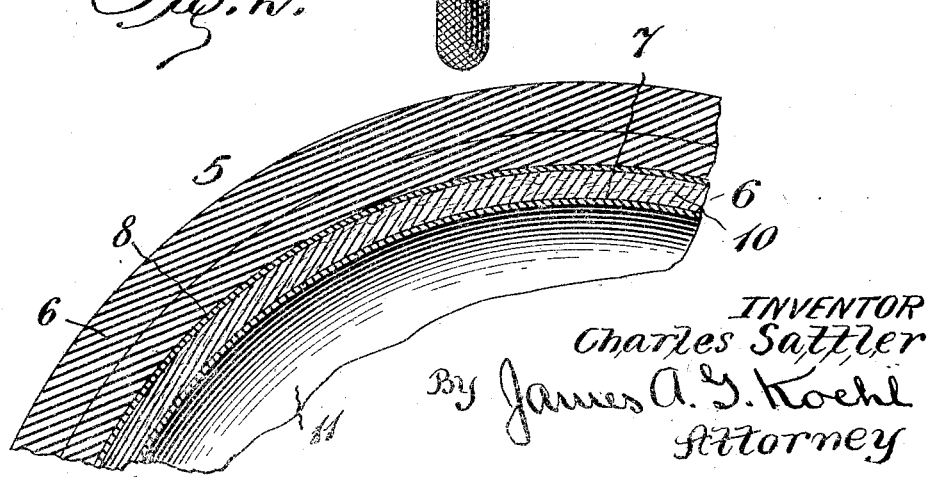
INVENTOR
Charles Sattler
By James A. G. Koehl
Attorney

UNITED STATES PATENT OFFICE.

CHARLES SATTLER, OF BROOKLYN, NEW YORK.

ELASTIC BODY.

1,379,216.     Specification of Letters Patent.     Patented May 24, 1921.

Application filed June 30, 1919. Serial No. 307,745.

*To all whom it may concern:*

Be it known that I, CHARLES SATTLER, citizen of the United States, and resident of Brooklyn, in the county of Kings and State of New York, have invented certain new and useful Improvements in Elastic Bodies, of which the following is a specification.

This invention relates to elastic bodies generally.

My invention is primarily designed for use in connection with hollow bodies of the kind wherein it is desired and frequently necessary to definitely seal the interior of the body against accidental external communication, and for the purpose of conveying a clear and comprehensible understanding of its novel qualities and good and useful functions, I choose to illustrate its use and advantages in connection with vehicle tires and particularly those of the pneumatic type.

Tires of the above type usually consist of an inner tube and an enveloping tread member or shoe, the former being adapted to be inflated to expand the shoe and render the structure capable of supporting loads of varying weights. Such forms of tires have been found quite useful due to their resilient qualities, but their utility has been seriously impaired on account of their sensitive susceptibility to the action of foreign objects or obstructions; a contact of the structure with such obstruction frequently resulting in a puncture of the inner tube and collapse of the shoe, causing what are known as rim-cuts and destruction of the tire fabric should the vehicle continue to travel.

My invention has for its particular object the provision of a material composed of various constituents, all mutually contributing with one another to render the material highly elastic and pliable so that its use in connection with tire bodies will not destroy the elasticity of such bodies and yet give to the structure self healing qualities and thus prevent undue escape of the air and cause the tire to maintain its inflated condition or state.

I wish it to be understood that I do not claim to eliminate the accidental puncture of tires, any more than that the use of my invention will avoid "blow outs," but I have designed and composed a material which, while minimizing serious damages to the tire at the time of a puncture will concurrently seal the puncture or aperture when the same is formed and I have so arranged the material or embodied the same in a tire structure whereby in the event of a blow-out, a highly buoyant supporting surface will be provided to permit the vehicle to continue in travel without detrimental results such as "rim-cutting" of the tire.

The various important features will be particularly pointed out hereinafter in connection with a detailed description of a preferred embodiment of my invention which I have selected for illustration in the accompanying drawing, in which similar reference characters indicate corresponding parts in the several views.

Figure 1 is a transverse section through a pneumatic tire showing the application of the invention thereto.

Fig. 2 is a section on line 2—2 of Fig. 1.

In the practical embodiment of the invention I employ a tire structure or body 5 which includes an inner inflatable member 6 formed preferably of inner and outer concentric tubes 7 and 8 and an enveloping shoe or tread member 9. The shoe may be of any suitable well known construction such as commonly used in the construction of pneumatic tires. However, the inner member is of a distinctive or peculiar design and the respective tubes 7 and 8 thereof are uniformly separated to define an intervening space therebetween for the reception of a heterogeneous material 10. The mentioned inner inflatable member is arranged within the enveloping shoe in a manner agreeing with that of well known forms of pneumatic tires so that the outer walls of said member, when inflated come in intimate contact with said shoe. This of course permits the air in the chamber 11 to exert its tendency to maintain the distended condition of the shoe while causing the latter to possess highly buoyant qualities. The inner inflatable member is provided with a valve 12 of the customary type whereby the chamber 11 may be supplied with air.

The inner and outer tubes 7 and 8 are each formed of impervious material such as rubber or the like so that under normal conditions the air in the chamber 11 will be held in confinement. The tubes are so positioned that the space therebetween is appreciable or comparatively wide. It should of course be understood that the space is circumferentially uninterrupted. The material provided as a filling for the space between the tubes is composed of constituents whose inherent qualities will not distract from the yielding properties of the shoe 5, the latter being formed preferably of rubber or an equivalent composition of matter. The material 10, in addition to possessing yielding qualities substantially in conformity with those of the shoe contains a substance or agency having calking properties so that in the event of abrasion or puncture of both the shoe and inner member of the tire, the puncture or aperture when formed will, through the stated properties of the material cause the fibrous mass around the aperture to take the place of the material which formerly occupied such aperture and the tendency of the air in the chamber 11 is to force the disintegrated particles and fibers of said material 10 into the aperture and pack the same therein and thus form a seal for such aperture to prevent further escape of the air. The constituents forming the composition or material 10 are preferably as follows: raw rubber, rosin, shellac, hair, wool, canvas, gum arabic.

I do not care to limit myself to the compounding together of all of such constituents as described above, but in practice I have found it highly desirable and efficacious. I also find this mixture preferable in view of the mentioned calking functioning alleged to their use and wish to lay emphasis upon the elastic qualities of a material constructed in this manner whereby to lend to the buoyancy of the tire structure.

By providing a space of appreciable proportion between the inner and outer tubes 7 and 8 it will be seen that in the event of a blow-out, the tire structure instead of being brought in injurious contact with the rim of the wheel, will be yieldingly held out of such contact by the collapsed condition of the inner member 7 and at such time it will be observed that the comparatively thick mass of material 10 will afford buoyancy and elasticity, the equivalent of a solid cushion tire.

At the point where the valve 12 passes the tubes 7 and 8, and surrounding the stem of the valve is a cushion 12' of rubber, the same confined between the said tubes, as shown.

What is claimed as new is:—

1. A tire structure consisting of a member formed of rubber, a fibrous constituent, and shellac.

2. A tire structure consisting of a member formed of rubber, rosin, shellac and a fibrous constituent.

3. A tire structure consisting of a member formed of rubber, rosin, shellac, a fibrous constituent and gum arabic.

4. A tire structure consisting of a member formed of rubber, rosin and a fibrous material such as wool or hair.

5. A tire structure consisting of a member formed of rubber, rosin, a fabric and fibrous material such as wool or hair.

6. A tire structure consisting of a member formed of raw rubber, rosin, shellac, hair, wool, canvas and gum arabic.

Signed at Brooklyn, in the county of Kings and State of New York, this 4th day of June, A. D. 1919.

CHARLES SATTLER.